(12) United States Patent
Sindhu

(10) Patent No.: US 8,094,580 B2
(45) Date of Patent: *Jan. 10, 2012

(54) DISTRIBUTED ADMISSION CONTROL

(75) Inventor: Pradeep Sindhu, Los Altos Hills, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/694,319

(22) Filed: Jan. 27, 2010

(65) Prior Publication Data

US 2010/0182931 A1 Jul. 22, 2010

Related U.S. Application Data

(63) Continuation of application No. 10/681,259, filed on Oct. 9, 2003, now Pat. No. 7,680,050.

(60) Provisional application No. 60/463,442, filed on Apr. 16, 2003.

(51) Int. Cl.
*H04L 12/26* (2006.01)
(52) U.S. Cl. ............. 370/252; 370/236; 370/395.5
(58) Field of Classification Search .......... 370/236, 370/252, 395.5
See application file for complete search history.

(56) References Cited

U.S. PATENT DOCUMENTS

| | | | |
|---|---|---|---|
| 6,182,125 B1 | 1/2001 | Borella et al. | |
| 6,400,710 B1* | 6/2002 | Golden et al. | 370/352 |
| 6,512,761 B1 | 1/2003 | Schuster et al. | |
| 6,654,914 B1 | 11/2003 | Kaffine et al. | |
| 7,116,639 B1 | 10/2006 | Gail et al. | |
| 7,463,591 B1* | 12/2008 | Kompella et al. | 370/248 |
| 7,680,050 B1* | 3/2010 | Sindhu | 370/236 |
| 2003/0076840 A1 | 4/2003 | Rajagopal et al. | |
| 2004/0010617 A1 | 1/2004 | Akahane et al. | |

OTHER PUBLICATIONS

Co-pending U.S. Appl. No. 10/681,259, filed Oct. 9, 2003; Pradeep Sindhu, entitled "Distributed Admission Control".

* cited by examiner

*Primary Examiner* — Jason Mattis
(74) *Attorney, Agent, or Firm* — Harrity & Harrity, LLP

(57) ABSTRACT

A first network client requests initiation of a data transfer with a second network client. An admission control facility (ACF) responds to the initiation request by performing admission analysis to determine whether to initiate the data transfer. The ACF sends one or more packets to the second network client. In response, the second network client sends acknowledgment packets back to the ACF. The ACF performs admission analysis based on the packets sent and the acknowledgment packets, and determines whether the data transfer should be initiated based on the analysis. The admission analysis may be based on a variety of factors, such as the average time to receive an acknowledgment for each packet, the variance of the time to receive an acknowledgment for each packet, a combination of these factors, or a combination of these and other factors.

20 Claims, 6 Drawing Sheets

DISTRIBUTED ADMISSION CONTROL

RELATED APPLICATIONS

This application is a continuation of U.S. application Ser. No. 10/681,259, filed Oct. 9, 2003 now U.S. Pat. No. 7,680,050, which claims priority under 35 U.S.C. §119 based on U.S. Provisional Application No. 60/463,442, filed Apr. 16, 2003, the disclosures of which are incorporated herein by reference.

BACKGROUND OF THE INVENTION

The present invention relates generally to networks and, more particularly, to admission control in networks.

Data experiences latency and jitter (variances in latency) as it travels through a network from a source to a destination. Latency may be caused by several characteristics of the network, such as the communications medium the data is transported over, processing of the data as it travels through the network, congestion in the network, and other factors. Some causes of latency are unavoidable, such as physical limits of transport media. An example of a physical limit is the speed of light in an optical transport medium. Depending on the application, some latency and jitter may be acceptable. For example, for some applications it may be acceptable to have a certain average latency, latency variance, or some combination of these. At some point, however, long latency and high jitter become unacceptable for most applications.

FIG. 1 illustrates the relationship between offered traffic load and latency in a network. As the offered load of traffic to the network increases, latency also increases. This general relationship between latency and offered load is a fundamental property of networks. At some point the amount of latency becomes unacceptable, which is generally defined as the point of congestion. Congestion is denoted in FIG. 1 by the horizontal line labeled "congestion." Below the congestion line congestion does not occur, which is characterized by traffic that has acceptable latency and/or jitter characteristics. Above the line, congestion occurs. Congestion is characterized by traffic having unacceptably high latency, jitter, or both. When there is almost no load, latency drops to the lowest delay the network is capable of.

Examples of latency-sensitive applications include voice, video, and real-time applications that need data to reach a destination within a certain time period. For latency-sensitive applications, there are negative consequences if latency and jitter between a source and a destination is above a certain threshold. Voice data, for example, may suffer from discernible audio glitches at the destination. Similarly, if video data is subjected to high latency and jitter the visual quality of the video data will be degraded at the destination. Therefore, these types of data are often transmitted over circuit-switched networks that maintain required latency guarantees for the data, thus eliminating degradation caused by latency and jitter at the destination. For other applications, such as e-mail and file transfers, high latencies (within limits) may cause little or no discernible degradation at the destination.

Connectionless networks, such as the Internet, do not guarantee bandwidth. Thus, networks entirely or partially made up of connectionless networks are not set up to guarantee maximum latency levels from end to end. Rather, in a network that is entirely or partially a connectionless network, latency and jitter increase when load on the network increases and decrease when the load on the network decreases. Furthermore, latency and jitter may increase in certain parts of a network and decrease in other parts. Therefore, it is difficult to convey latency- and jitter-sensitive data in such networks. Without a mechanism to specifically control latency and jitter, networks that are entirely or partially connectionless are not appropriate for carrying latency- or jitter-sensitive data.

SUMMARY OF THE INVENTION

According to one embodiment of the invention, systems and methods consistent with the principles of the invention perform distributed admission control by determining a state of network resources, and then determining whether to initiate a data transfer based on the state of the network resources. The determination of whether to initiate a data transfer between a first and second client is made by an admission control facility (ACF) that sends packets to the second network client, monitors acknowledgment packets for each sent packet, analyzes the acknowledgment packets to determine a state of the network resources, and decides whether to initiate a data transfer between the clients based on the analysis.

The acknowledgment packets may be analyzed by the ACF in a variety of ways. For example, the mean, variance, or combination of mean and variance of the response times may provide an indication of whether network resources can handle more traffic. The ACF may also analyze other factors, such as packet loss based on packets that are not acknowledged by the second network client. The ACF may decide whether to initiate a data transfer based on an analysis of one or more of these characteristics of the acknowledgments. Other admission control analyses may also be performed by the ACF using the mean, variance, or packet loss calculations, some combination of these, or some combination of these and other factors.

In networks that enable setting up a path through the network, such as a label-switched path, the ACF may send packets along one or more potential paths, analyze the packets received in response to the packets, and select a path based on the acknowledgment analysis. The ACF may decide that a data transfer with the second client should not be initiated if no suitable path is found. If no path is found the ACF may then repeat the analysis for some or all of the paths at a later time.

Other aspects of systems, devices, and methods consistent with principles of the invention are described herein. It should be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF EMBODIMENTS

Figure 1:
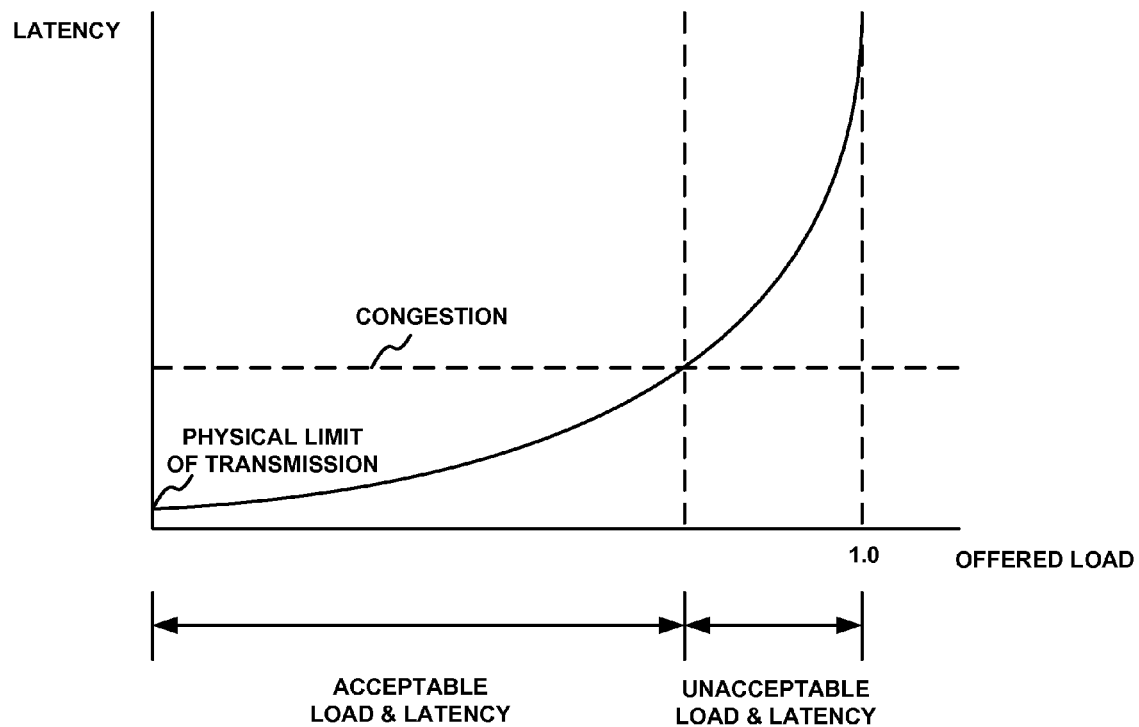
FIG. 1 is a diagram that illustrates the relationship between load and latency in a network.

Reference will now be made in detail to embodiments consistent with the principles of the invention, examples of which are illustrated in the accompanying drawings. The same reference numbers may be used in different drawings to refer to the same or like parts.

Some types of network applications are more latency- and jitter-sensitive than others. For latency- and jitter-sensitive applications, it is common to have a service-level agreement (SLA) between the customer and the service provider that requires the service provider to deliver data, such as latency-sensitive data, within specific parameters. For example, the SLA may include maximum latency and jitter requirements, as well as other service level requirements.

In accordance with the principles of the invention, latency- and jitter-insensitive data is allowed in the network without controls or checks. For latency- and jitter-sensitive data, however, distributed admission control is carried out. According to embodiments consistent with the principles of the invention, distributed admission control may be carried out by sending one or more reflector packets to a destination and analyzing acknowledgments received in response to the one or more packets. More particularly, in order for a first network client to set up a data transfer with a second network client, the first network client notifies an admission control facility (ACF) that it would like to initiate the transfer. Before initiating the transfer, the ACF performs admission control to determine the state of network resources between the first client and second client. For example, the ACF may determine whether network resources between the source and destination have low enough latency and jitter levels to meet the requirements of an SLA for the data to be transferred between the first and second network clients.

The ACF performs admission control by sending one or more reflector packets through the network to the second network client. The second network client responds to each received reflector packet by sending an acknowledgment packet back to the ACF. The ACF analyzes the acknowledgment packets and decides whether to initiate a data transfer between the first and second client.

In an alternative embodiment, two ACFs exchange packets in a similar manner. For example, one ACF may be associated with the sending end and one ACF may be associated with the receiving end of a data transfer. Using admission control consistent with principles of the invention, the sending end ACF can determine the state of the network resources between the sending and receiving end ACFs. Based on the determined state, the ACF associated with the sending end determines whether to initiate a data transfer between the first and second client.

Admission control techniques consistent with the principles of the invention may be used to implement distributed admission control in a variety of scenarios. For example, the techniques may be used in one-to-one, one-to-many, many-to-one, and many-to-many data transfer scenarios.

Figure 2:
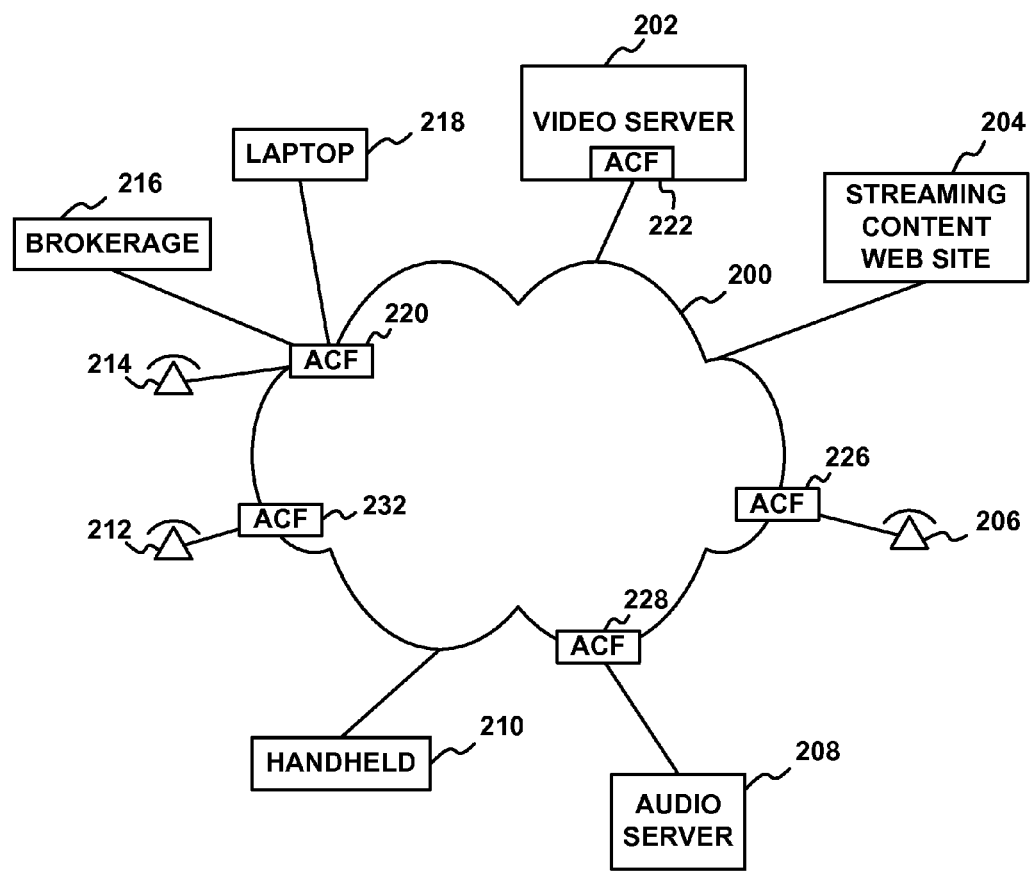
FIG. 2 illustrates a network using distributed admission control consistent with the principles of the invention.

FIG. 2 illustrates a network 200 in which distributed admission control is performed in a manner consistent with the principles of the invention. Network 200 connects various network clients, such as a video server 202, a streaming content web site 204, a telephone 206, an audio server 208, a handheld device 210, a telephone 212, a telephone 214, a brokerage site 216, and a laptop 218. Clients 202, 206, 208, and 212-218 are connected to network 200 via ACFs 220-232. Clients 204 and 210 are not connected to network 200 via ACFs.

Network 200 may be one network or a collection of connectionless and/or connection-oriented networks. Depending on the composition of the network, network clients 202-218 may or may not be able to establish a guaranteed-bandwidth connection between themselves through network 200. Consistent with the principles of the invention, each of ACFs 220-232 determines whether to initiate a data transfer between one or more first network clients and one or more other network clients by analyzing the state of resources in network 200 between the first network client and the other clients. The state of resources is determined by an ACF sending one or more reflector packets to one or more ACFs and/or network clients, receiving acknowledgment packets in response to each reflector packet, and analyzing characteristics of the acknowledgment packets. The analysis provides an indication of the state of resources in network 200. The ACF uses the state analysis to determine whether to initiate a data transfer between the first network client and one or more other network clients.

In this way, admission to network 200 is distributed out to ACFs 220-232. Basing admission on the state of network 200 resources allows latency and jitter in network 200 to be managed. Performing admission control at ACFs 220-232 also removes the need to maintain state, such as connection state, within elements of network 200 for purposes of managing latency and jitter, as is sometimes done in networks. The amount of state needed to maintain connections can be very large, on the order of $N^2$, where N is the number of clients in the network. Performing admission control at ACFs 220-232 also eliminates the need to maintain global network state within an ACF.

Using telephone 212 and ACF 232 by way of example, suppose a caller at telephone 212 wants to access information on audio server 208. The caller initiates the call by picking up the handset of telephone 212. Telephone 212 indicates to ACF 232 that a call should be set up with audio server 208. ACF 232 determines whether to set up the call between telephone 212 and audio server 208 by using admission control, consistent with the principles of the invention. ACF 232 first sends one or more reflector packets to audio server 208. As each reflector packet is sent, ACF 232 may start tracking, for example, the response time it takes to receive an acknowledgment packet from audio server 208 for each reflector packet. ACF 232 may also monitor other characteristics of the acknowledgment packets in addition to or instead of response time. Generally, an ACF may send two types of packets, referred to generally as "reflector" packets. The first type of reflector packet, called a "time delay" packet, is used primarily to determine how long it takes to receive an acknowledgment packet. An example of a time delay packet is a ping packet. The second type of reflector packet, called a "control" packet, has some purpose beyond eliciting an acknowledgment. A control packet may, for example, be used to establish a session, initiate a data transfer, set up a path, or perform some combination of these operations. Acknowledgments to control packets may be also analyzed, like the acknowledgments to time delay packets, to determine the state of network resources between two or more clients. A combination of these types of packets may also be used.

For example, ACF 232 may send one or more setup packets to audio server 208 for establishing a path, connection, or session between telephone 212 and audio server 208. Audio server 208 may acknowledge the packets in some way. ACF 232 analyzes the acknowledgments and determines whether or not to set up the data transfer. If ACF 232 determines that a data transfer should not be initiated, ACF 232 may simply stop sending packets, thus terminating communication with audio server 208.

ACF 232 may also send packets having particular characteristics to determine how latency and/or jitter impact packets having these particular characteristics. For example, ACF 232 may send packets having different lengths or types of data. Depending on the characteristics of the acknowledgements to these packets, ACF 232 may decide whether to set up a data transfer.

Audio server 208 responds to each reflector packet by sending an acknowledgment packet back to ACF 232. In another embodiment, instead of audio server 208 receiving and responding to the packets, ACF 228, the ACF associated with it, handles the reception of reflector packets and response.

As each acknowledgment packet arrives, ACF 232 may log the acknowledgment. For example, ACF 232 may stop a timer associated with the sent packet corresponding to the acknowledgment packet. A timeout mechanism may be used so that ACF 232 only waits a certain amount of time for acknowledgment packets. For example, ACF 232 may wait until an acknowledgment packet is received for each sent packet or until a predetermined period of time has elapsed since the reflector packets were sent, whichever occurs first. ACF 232 may then proceed to analyze the response times for the acknowledgment packets that were received. Absence of acknowledgment packets may also be considered by ACF 232 in the admission control analysis.

ACF 232 may analyze acknowledgment response times in a variety of ways. For example, ACF 232 may analyze how long it takes for each acknowledgment packet to be received from the time the corresponding reflector packet was sent, and may also take into account response times for particular types of packets and their acknowledgments. ACF 232 may also take into account analyses of the response times, such as average delays for acknowledgment packets, the variance in delays for the acknowledgment packets, or a combination of these and other calculations. Other factors in addition to the acknowledgment response times may also be used in the admission analysis. For example, ACF 232 may receive information from network 200 regarding congestion or other network characteristics, and use this information as part of the admission analysis. ACF 232 may also consider packet loss as a factor in the admission analysis. Finally, acknowledgment packets may include information, such as a time stamp or hop count, that may be used in the admission analysis.

Based on the admission analysis, ACF 232 may determine whether or not to initiate a data transfer with audio server 208. If ACF 232 decides not to initiate a data transfer because the state of network resources between telephone 212 and audio server 208 is not appropriate, ACF 232 may decide to retry the admission analysis immediately or at a later time.

Network 200 may include network equipment that, although not providing guaranteed-bandwidth connections, may provide some type of connection mechanism, such as label-switched paths (LSPs). For example, network 200 may implement multi-protocol label switching (MPLS), a protocol used for establishing an LSP between one or more of network clients 202-218, between ACFs 220-232, or between network clients 202-218 and ACFs 220-232. The LSPs may be created dynamically as needed, or may be set up as static LSPs. In such a network, systems and methods consistent with the principles of the invention may perform admission analysis on one or more LSPs fully or partially connecting network clients 202-218.

Using ACF 232 again by way of example, suppose a caller at telephone 212 wants to set up a call with audio server 208. And assume, for sake of example, that ACF 232 uses MPLS to dynamically set up LSPs or transmit data over static LSPs, although other techniques for paths may also be used. Telephone 212 notifies ACF 232 that a data transfer needs to be initiated with audio server 208. In response, ACF 232 may initiate one or more LSPs through network 200 to audio server 208. ACF 232 may then perform an admission analysis for one or more of the potential LSPs. ACF 232 might reject all the potential LSPs, or select an LSP that has the best characteristics based on the admission analysis.

Each of ACFs 220-232 in FIG. 2 may implement the distributed admission control consistent with the principles of the invention. For example, ACF 232 may determine whether to initiate a data transfer with video server 202 by first determining the state of network 200 resources using admission analysis consistent with the principles of the invention. Each of ACFs 220-232 may also perform admission control for multiple clients. For example, ACF 220 performs admission control for telephone 214, brokerage 216, and laptop 218.

In embodiments consistent with the principles of the invention, admission control functions may be split between a client and an ACF. The client and the ACF may coordinate with each other regarding admission control. For example, splitting the admission control function may allow a client to maintain control over how the admission control process is carried out by the ACF. A client could download particular admission control parameters to its corresponding ACF, and the ACF then carries out admission control using the parameters. The admission control functions and elements may be split between the client and ACF in numerous ways. The ACF may also upload admission control information, such as permissions, to the client. The admission control function could also be migrated entirely into one or more of client devices 202-218, as illustrated by ACF 222 in video server 202. Migrating all the ACF functionality into a client gives the client complete control over the admission control process. In such embodiments, a separate ACF connecting the client to network 200 is not necessary.

Each of ACFs 220-232 is responsible for handling admission control for their clients, and initiating data transfers when the admission control process indicates that network 200 resources are in an appropriate state for the data transfer. For example, a data transfer may be initiated when an ACF determines that the latency or jitter characteristics of network 200 resources are below a certain threshold. Each of ACFs 220-232 comprises elements for carrying out these operations. The elements may be comprised of hardware, software, or a combination of hardware and software.

Figure 3:
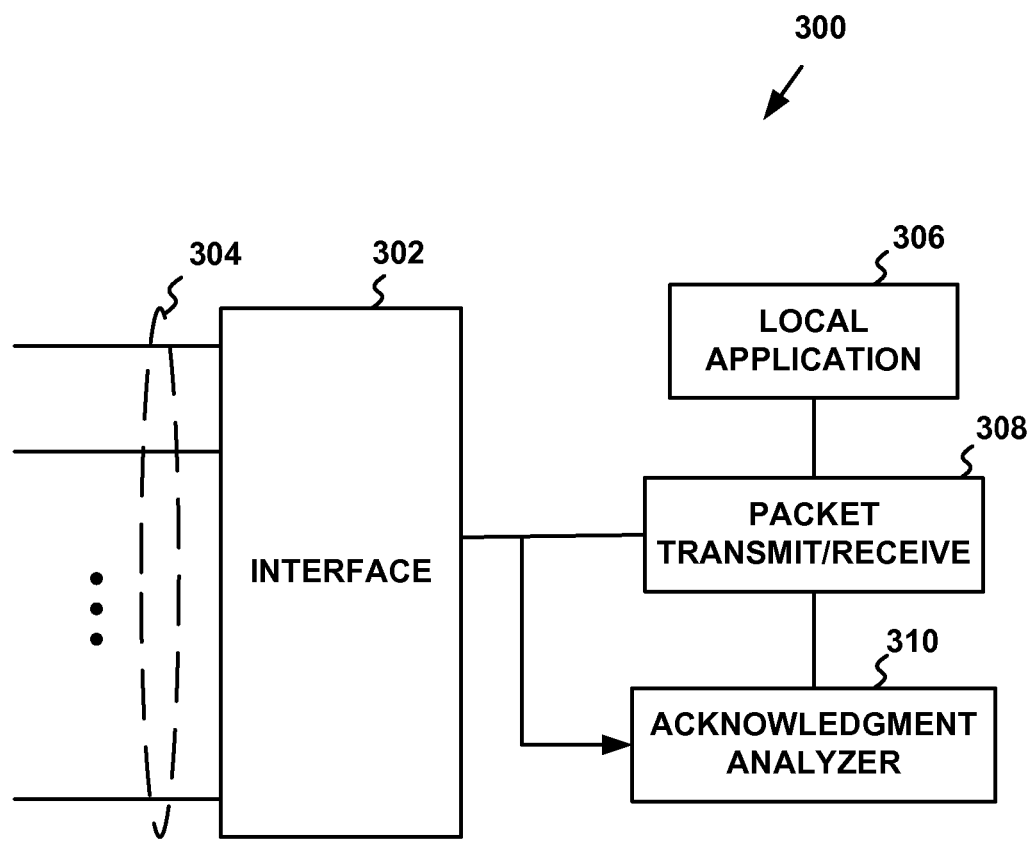
FIG. 3 illustrates a system for performing distributed admission control consistent with the principles of the invention.

FIG. 3 illustrates a system for performing distributed admission control consistent with the principles of the invention. The elements and functions of system 300 may be used in any of ACFs 220-232 or network clients 202-218. In other embodiments consistent with the principles of the invention, the elements and functions may be divided between a client and its respective ACF. For purposes of explanation, system 300 will be described as being in one of ACFs 220-232. Further, the elements and functions of system 300 may be implemented entirely in software, entirely in hardware, or in a combination of hardware and software.

System 300 includes an interface 302, network links 304, a local application 306, a packet transmit/receive (T/R) element 308, and an acknowledgment analyzer 310. Links 304 may be connected to network 200 and one or more clients via interface 302. The connection to these elements may be direct or through other devices.

Local application 306 carries out local functions for system 300. For example, in ACFs 220-232, local application 306 may be dedicated to managing admission control, packet routing, and other functions for one or more clients. Local application 306 creates application information that is sent to packet T/R 308. Packet T/R 308 packetizes the information and transmits the packets to interface 302.

Interface 302 handles protocol layer processing on the packets and forwards packets on one or more of links 304. Packets arriving on links 304 are received by interface 302, which may process the packets, and forward them to packet T/R 308.

Packets flowing into and out of system 300 may be network traffic, application-related packets, control-related packets, or any other type of packet. For application-related packets, packet T/R 308 depacketizes the application information and forwards the application information to local application 306 for processing. For control-related packets, packet T/R 308 depacketizes the control information and may act on it. Packet T/R 308 may also forward the control information to other elements in system 300 or place the control information in packets and send them back out on links 304 to other network clients, or do both—act on the information and forward the information back out. The control information may include, for example, information about network 200 generally, and information regarding network resources, such as congestion, network topology, or other network-related information. The control information may also include information from other devices in network 200, such as acknowledgments or path setup information.

To initiate a data transfer, assume that a client has sent a request to system 300 to initiate a data transfer with a particular network client. For example, assume that in FIG. 2 a caller at telephone 212 wants to set up a data transfer with audio server 208. In this case, ACF 232 handles the admission control process for telephone 212. ACF 232 includes system 300 of FIG. 3.

Returning to FIG. 3, the data transfer initiation request from telephone 212 may include information regarding the type of data transfer to be initiated, minimum data transfer requirements that must be met, or some combination of these types of information. Local application 306 receives the request and notifies packet T/R 308 that a data transfer needs to be initiated with audio server 208. Packet T/R 308 then performs an admission control process to determine whether or not the data transfer should be initiated, consistent with the principles of the invention.

Packet T/R 308 first coordinates with acknowledgment analyzer 310 to determine whether the state of network 200 resources is appropriate for a data transfer to be initiated between telephone 212 and audio server 208. Packet T/R 308 may send out one or more reflector packets to audio server 208, and may provide acknowledgment analyzer 310 with information about the reflector packets. The information may include, for example, identification (ID) information for each reflector packet, packet type information, and the time each reflector packet is transmitted. Packet T/R 308 may also send to acknowledgment analyzer 310 information regarding the type of data transfer to be initiated, minimum data transfer requirements that must be met, and other information regarding the data transfer to be initiated.

Audio server 208 receives the reflector packets and responds by sending a response packet, such as an acknowledgment packet, back to system 300. Network interface 302 receives the acknowledgment packets over links 304 and forwards them to packet T/R 308. Acknowledgment analyzer 310 also receives the acknowledgment packets.

Acknowledgment analyzer 310 performs admission analysis based on information regarding the reflector packets, information regarding the acknowledgment packets, or some combination of these. The results of the analysis are forwarded to packet T/R 308. If packet T/R 308 determines that a data transfer can be initiated, packet T/R 308 proceeds to coordinate with local application 306 to initiate the data transfer between the network clients. If packet T/R 308 determines that a data transfer should not be initiated, however, packet T/R 308 may end this admission control effort. If the effort is abandoned, packet T/R 308 may send an admission status message, such as an initiation rejection indication, to telephone 212, or coordinate with local application 306, telephone 212, or both, to determine whether the data transfer still needs to be initiated.

Packet T/R 308 may have multiple admission analyses in progress. For example, packet T/R 308 may have one or more admission analysis threads being executed simultaneously for one or more admission efforts. When multiple threads are working on an admission analysis for one source-destination pair, packet T/R 308 may implement the threads so that the first successful thread stops the other threads. Alternatively, the results of multiple successful threads may be compared by packet T/R 308, which then chooses the best of the successful threads.

In LSP-capable networks, system 300 may perform admission analysis on one or more LSPs, as discussed above. Packet T/R 308 may forward one or more packets on one or more potential LSPs. Acknowledgment analyzer 310 may analyze the acknowledgment packets for each of the LSPs. Based on the admission analysis, acknowledgment analyzer 310 may reject all the LSPs or select one or more of them for data transfer. If one of the LSPs is selected, packet T/R 308 notifies local application 306 that a suitable LSP was found. Local application 306 and packet T/R 308 then coordinate the process of initiating the data transfer between telephone 212 and audio server 208.

Figure 4:
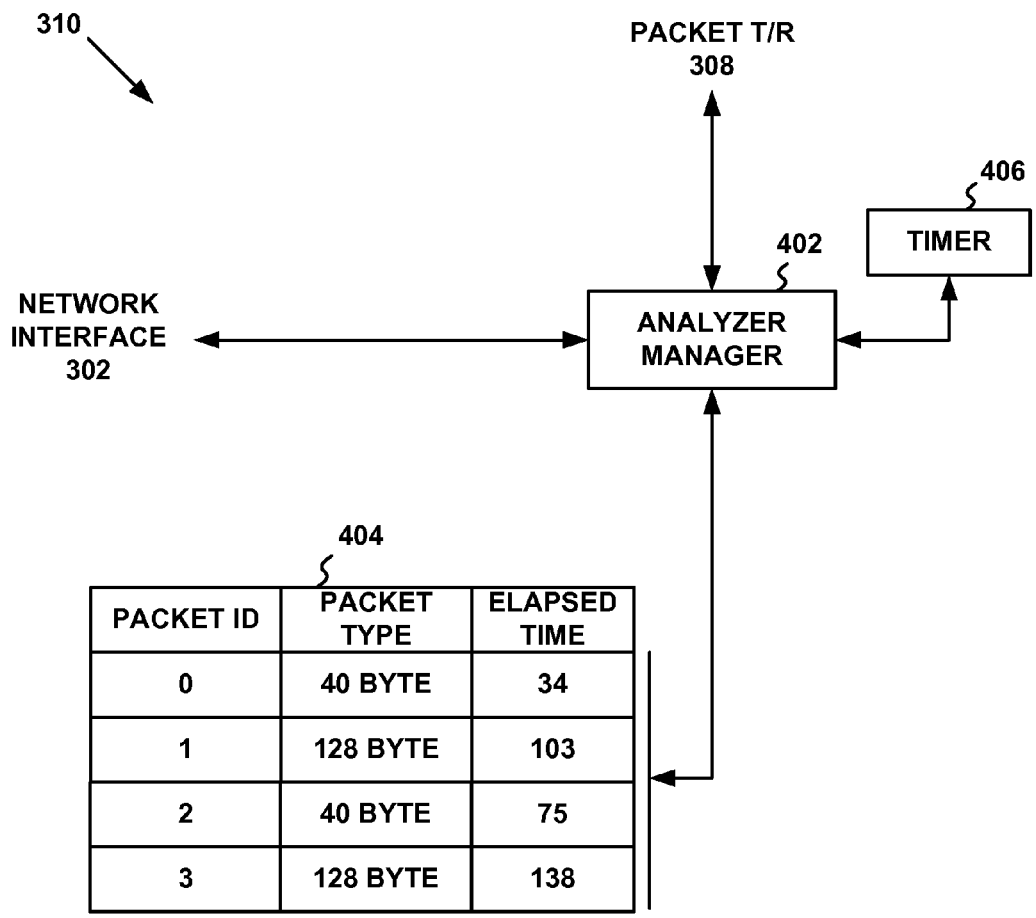
FIG. 4 illustrates an embodiment of acknowledgment analyzer 310 consistent with the principles of the invention.

FIG. 4 illustrates an exemplary embodiment of acknowledgment analyzer 310 of FIG. 3 consistent with the principles of the invention. In this embodiment, acknowledgment analyzer 310 includes an analyzer manager 402, a timer 406, and a table 404. Analyzer manager 402 is connected to network interface 302, packet T/R 308, timer 406, and table 404. Analyzer manager 402 uses table 404 to track acknowledgment packets corresponding to each reflector packet sent by packet T/R 308 as part of an admission control process. Table 404 includes entries for each reflector packet that was sent. Each entry may include a packet ID field, a packet type field, and an elapsed time field. The elapsed time field may be used for tracking the elapsed time between when a reflector packet is sent by packet T/R 308 and when analyzer manager 402 receives an acknowledgment packet corresponding to the packet. Table 404 may be replicated for each admission analysis being performed.

Analyzer manager 402 receives information from packet T/R 308 regarding the reflector packets, such as packet IDs, the types of reflector packets, and the times reflector packets are sent to a destination, and uses the information to create entries in table 404. Analyzer manager 402 also resets and starts timer 406 to track the total time analyzer manager 402 waits for acknowledgment packets. As analyzer manager 402 receives each acknowledgment packet from network interface 302, it updates the entry in table 404 corresponding to the reflector packet which elicited the acknowledgment packet.

Analyzer manager 402 also monitors timer 406 to determine the elapsed time since the reflector packets were sent by packet T/R 308 to the destination. If timer 406 reaches a predetermined limit, analyzer manager 402 may proceed with the admission analysis. Reaching a predetermined time limit before receiving an acknowledgment packet for each reflector packet may result from several problems, such as packets lost in the network, the destination not responding, or some other condition.

Figure 5:
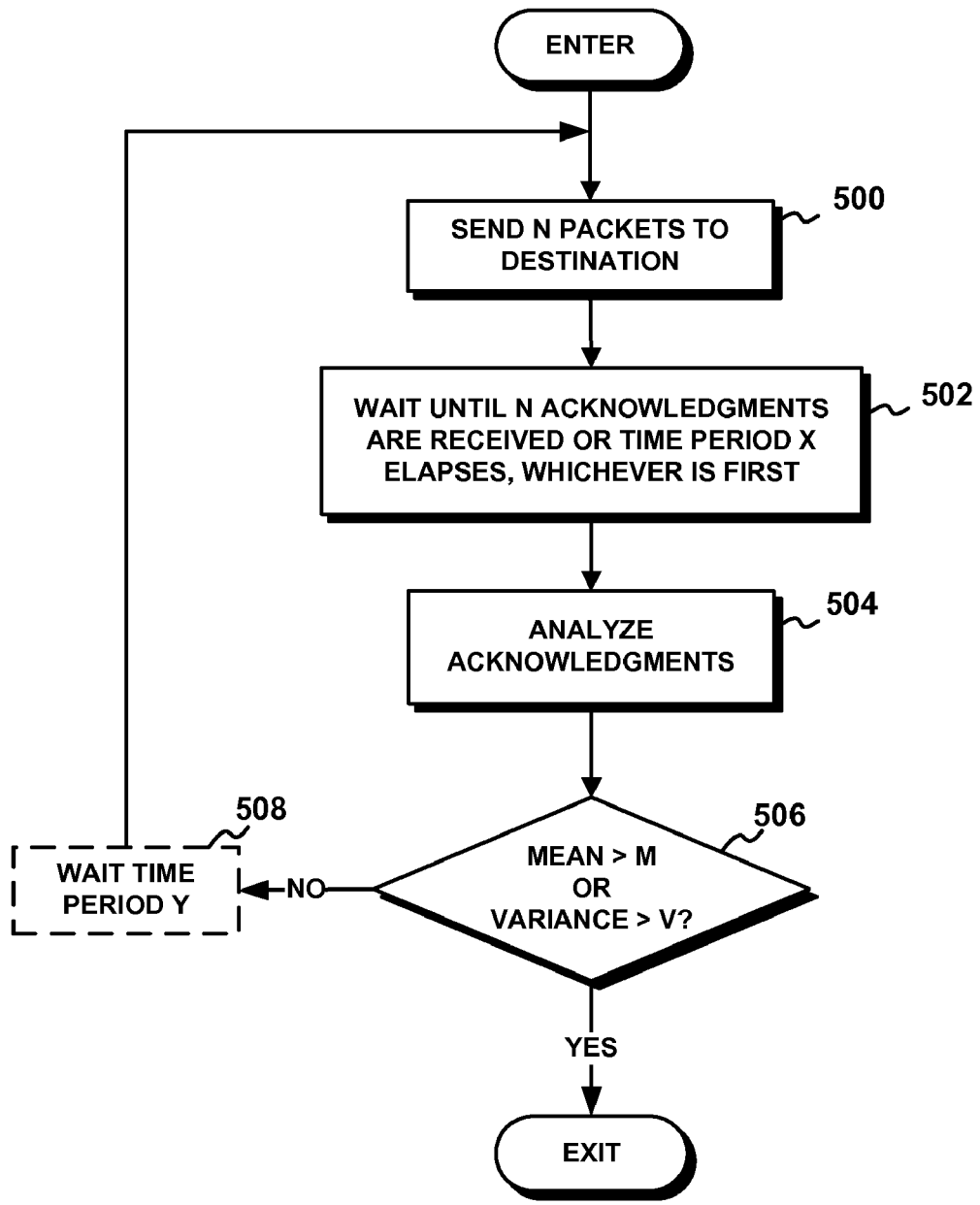
FIG. 5 illustrates a flowchart implementing distributed admission control consistent with the principles of the invention.

FIG. 5 illustrates a flowchart implementing an embodiment of admission control consistent with the principles of the invention. The acts illustrated in FIG. 5 may, for example, be performed by system 300 of FIG. 3. To start the admission control process, N reflector packets (where, e.g., N>=1) are transmitted to a destination (act 500). The process then waits until acknowledgment packets are received for each of the N packets or until a time period $T_{timeout}$ has elapsed, whichever occurs first (act 502).

The response times associated with each acknowledgment packet are analyzed (act 504) to determine the state of the resources in the network, and a decision is made as to whether or not a data transfer should be initiated. The decision may, for example, be based on whether the mean of the acknowledgment response times exceeds a threshold M, or whether the variance of the acknowledgment response times exceeds a threshold V (act 506). The decision may also be based on a combination of these factors, or these factors and other factors, such as packet loss. If it is determined that a data transfer should not be initiated at this time, the process returns to sending N packets (act 500) to start another admission analysis process. In one embodiment, the process waits a period of time Y (act 508) before sending the N packets (act 500) in order to allow time for the state of the network resources to change. In one embodiment, a decision is made to simply stop attempting to initiate a data transfer.

Figure 6:
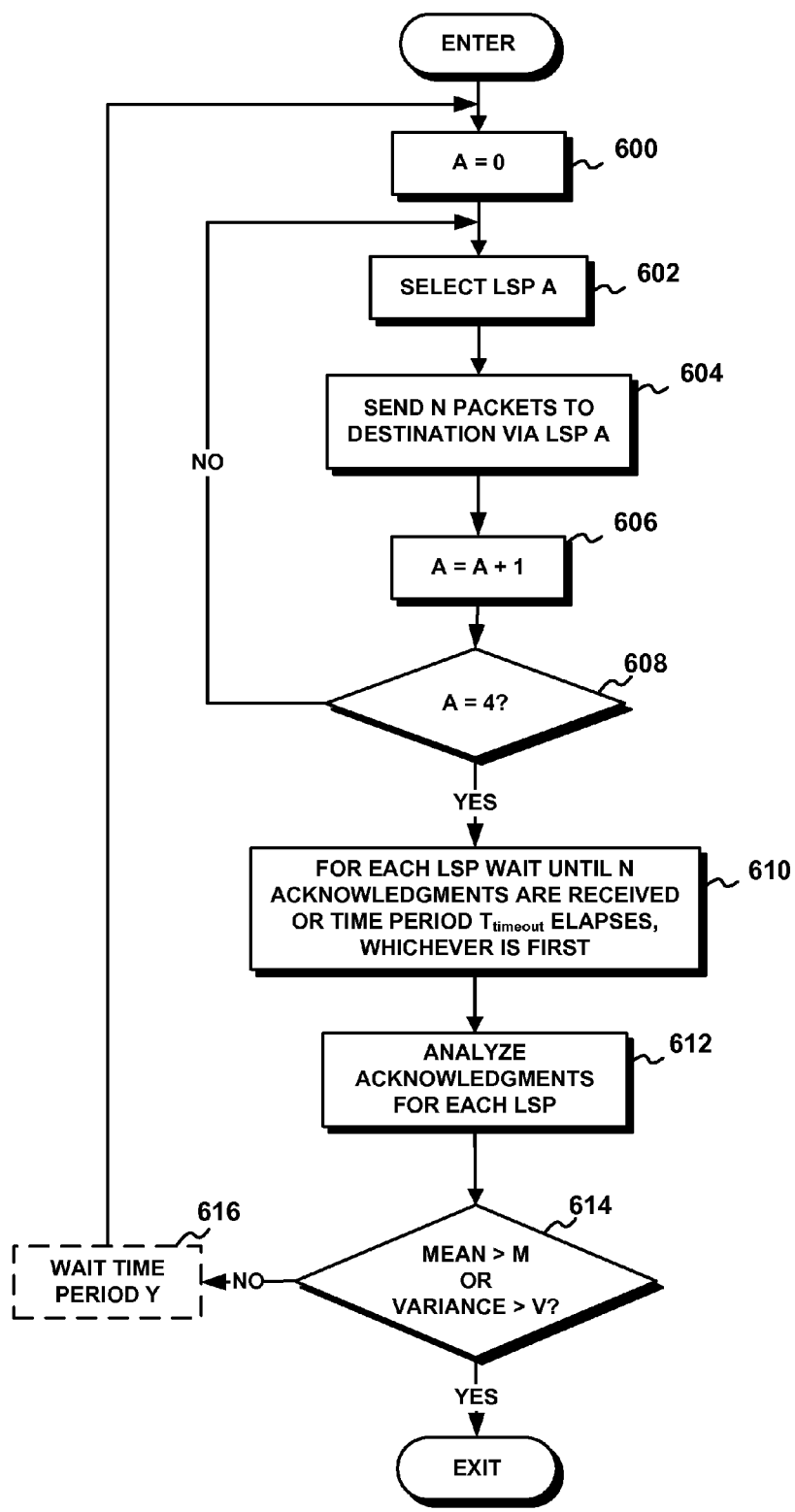
FIG. 6 illustrates a flowchart for implementing distributed admission control in a network having a path mechanism, consistent with the principles of the invention.

FIG. 6 illustrates a flowchart for implementing distributed admission control in a network having a path-creation mechanism, such as LSPs using MPLS, consistent with the principles of the invention. A separate admission analysis may be performed for a single LSP, or each of several LSPs.

The process illustrated in FIG. 6 is similar in some respects to the process illustrated in FIG. 5. For example, sending N packets (act 604), waiting until all acknowledgment packets are received or a time period $T_{timeout}$ elapses (act 610), analyzing the acknowledgment packets (act 612), determining whether to initiate a data transfer (act 614), and waiting for time period Y (act 616) are similar to acts in the process illustrated in FIG. 5.

The admission control process of FIG. 6 begins by setting a variable A to zero (act 600). Variable A identifies individual LSPs used in the admission analysis. LSP A is first selected (act 602). This may involve first setting up an LSP or selecting a known LSP between a first and a second network client. Then, similar to FIG. 5, N reflector packets are sent via LSP A to a destination (act 604). Variable A is incremented (act 606) and checked to determine whether all LSPs to be included in the admission analysis have been used. In the embodiment illustrated in FIG. 6, there are four LSPs that will be included in the analysis (act 608). That is, four LSPs, LSPs 0-3, will have packets sent on them. If A does not equal four, the process repeats with selecting the next path A (act 602). The loop continues until each of LSPs 0-3 have packets sent on them.

When variable A equals four (act 608), meaning packets have been sent across each of LSPs 0-3, the process continues by waiting for N acknowledgment packets for each LSP, or until time period $T_{timeout}$ elapses, whichever occurs first (act 610). In one embodiment, a separate expiration timer is maintained for each LSP. Alternatively, admission analysis may start immediately upon receiving N acknowledgment packets for a single LSP. The acknowledgment packets for each LSP are analyzed (act 612), and it is determined whether a data transfer should be initiated on one or more of the LSPs based on whether the mean of the acknowledgment response times exceeds a threshold M, or whether the variance of the acknowledgment response times exceeds a threshold V (act 614). The decision may also be based on a combination of these factors, or these factors and other factors, such as packet loss. If no suitable LSP is found, the process may continue by setting variable A to zero (act 600) to initiate another analysis of LSPs. In one embodiment, the process waits time period Y before initiating another analysis (act 616). Initiation of a data transfer may also be dropped completely. In one embodiment, the process is repeated only for a subset of the LSPs that were originally analyzed. This may be helpful in instances where certain paths are found to be so unsuitable in a first analysis that they should not be included in a subsequent analysis.

CONCLUSION

As described, admission control is implemented in a network. Packets are sent to a destination, which sends acknowledgements back to the packet source. The acknowledgment responses are analyzed to determine a state of the network resources between the packet source and the destination. The foregoing description of embodiments of the invention provides illustration and description, but is not intended to be exhaustive or to limit the invention to the precise form disclosed. Modifications and variations are possible in light of the above teachings or may be acquired from practice of the invention.

For example, although the admission control analysis has been described as being performed in response to a specific data transfer initiation request, the analysis may also be performed on an ongoing basis for various parts of a network or various destinations. When a client desires to initiate a data transfer, the ACF may have already analyzed the state of the network for the request. This may be useful in circumstances when one client initiates frequent data transfers with a particular other client, or for cutting down the latency of the admission control facility.

Although the admission control process is described herein as being performed at the "edge" of the network, admission control consistent with the principles of the invention may be practiced anywhere in a network.

The admission control systems and methods described herein have been described primarily in terms of an initiator of a data transfer. It should be understood, however, that admission control may be performed for any data transfer in any direction. For example, clients at one or both ends of a communication session may have admission control processes carried out for data transfer. Both sources and sinks of data transfers may perform admission control consistent with the principles of the invention.

For purposes of explanation, the term "packet" is used herein, although any network data transfer unit may be used. The particular type of data transfer unit depends on the type of network the data is transported over.

Moreover, while a series of acts has been presented in describing embodiments consistent with the principles of the invention, the order of the acts may be different in other implementations consistent with principles of the invention and non-dependent acts may be performed in parallel. Additionally, lines with arrows are used in the figures to generally illustrate the flow of data. In practice, embodiments consistent with the principles of the invention may send data on these lines in both directions. No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents. It is intended that the specification and examples be considered as exemplary only, with the true scope and spirit of the invention being indicated by the following claims.

What is claimed is:

1. A method, comprising:
   sending, by a network device, one or more packets on a plurality of paths,
   where the one or more packets include one or more first type of packets and one or more second type of packets, the network device using the one or more first type of packets to determine timing information associated with the plurality of paths, and the network device using the one or more second type of packets to perform at least one operation associated with data transfer, and
   where at least one first type of packet, of the one or more first type of packets, and at least one second type of packet, of the one or more second type of packets, are sent on each of the plurality of paths;
   receiving, by the network device, one or more responses to the one or more packets;
   selecting, by the network device, a path, of the plurality of paths, when response times, associated with the received one or more responses, do not exceed a threshold;
   initiating, by the network device, a data transfer on the selected path;
   sending, by the network device, one or more additional packets on one or more of the plurality of paths when the response times exceed the threshold, the one or more additional packets including at least one of the one or more first type of packets and at least one of the one or more second type of packets; and
   determining, by the network device, that a data transfer is to be initiated on a path, of the one or more of the plurality of paths, based on one or more responses to the one or more additional packets.

2. The method of claim 1, further comprising:
   analyzing a response time associated with a first response, of the one or more responses to the one or more packets, to a first type of packet, of the one or more first type of packets; and
   analyzing a second response, of the one or more responses to the one or more packets, to a second type of packet, of the one or more second type of packets, to determine a state of network resources,
   where selecting the path includes:
      selecting the path based on at least one of the response time or the determined state of network resources.

3. The method of claim 1, where selecting the path comprises:
   comparing of a response time, associated with a response, of the one or more responses, to at least one of the one or more first type of packets, to the threshold.

4. The method of claim 1, further comprising:
   determining an average delay associated with the one or more responses, where selecting the path includes:
      selecting the path based on the determined average delay.

5. The method of claim 1, further comprising:
   determining a variance in delays associated with the one or more responses, where selecting the path includes:
      selecting the path based on the determined variance.

6. The method of claim 1, further comprising:
   receiving, from a first device, a request to initiate a transfer of data between the first device and a second device,
   where sending the one or more packets is based on the received request.

7. The method of claim 1, further comprising:
   determining that the data transfer on the selected path is to not be initiated when the response times exceed the threshold;
   sending, based on determining that the data transfer is to not be initiated, the one or more additional packets on the one or more of the plurality of paths;
   receiving, in response to sending the one or more additional packets, the one or more responses to the one or more additional packets; and
   initiating, in response to receiving the one or more responses to the one or more additional packets, that the data transfer on the path, of the one or more of the plurality of paths, is to be initiated when response times, associated with the one or more responses to the one or more additional packets, do not exceed the threshold.

8. A system comprising:
   a first element to:
      transmit a plurality of packets via a plurality of paths,
      where the transmitted plurality of packets include at least one first type of packet, to determine time delay, and at least one second type of packet, to perform an operation associated with data transfer,
      where the at least one first type of packet and the at least one second type of packet are transmitted via each of the plurality of paths, and
      receive responses to the transmitted plurality of packets; and
   a second element to:
      analyze the received responses to determine latency associated with the received responses, and
      determine to initiate a data transfer on at least a first path, of the plurality of paths, when the latency, associated with the received responses, does not exceed a threshold,
      where the first element is to transmit one or more additional packets on the plurality of paths when the latency, associated the received responses, exceeds the threshold, and
      where the second element is to determine to initiate a data transfer on a different path, of the plurality of paths, when latency, associated with one or more responses to the one or more additional packets, does not exceed the threshold.

9. The system of claim 8, where the operation comprises at least one of initiating a data transfer, establishing a session, or setting up a path.

10. The system of claim 8, where the second element is further to:
    operate a timer that tracks an amount of time elapsed between transmission of a packet, of the transmitted plurality of packets, and receipt of a response, of the received responses, to the packet.

11. The system of claim 8, where the second element is further to:
    determine that one or more of the responses are received after a particular period of time, and
    determine to not initiate the data transfer on the first path based on determining that the one or more of the responses are received after the particular period of time.

12. The system of claim 8, where the second element is further to:
- determine that at least one of latency or jitter, associated with the plurality of paths, is below a particular threshold, based on the analyzed responses, and
- determine to initiate the data transfer based on determining that the at least one of latency or jitter is below the particular threshold.

13. The system of claim 8, further comprising:
- a third element to receive a request to initiate the data transfer, associated with the first path, to a network client,
- where the second element is to:
  - determine to initiate the data transfer on the first path, and
  - select the first path in response to determining to initiate the data transfer, and
- where the first element is to initiate the data transfer, on the selected first path, to the network client.

14. The system of claim 13, where, when analyzing the received responses, the second element is further to at least one of:
- determine an average delay associated with the received responses, or
- determine a variance in delays associated with the received responses, and
- where the second element is further to compare at least one of the determined average delay or the determined variance in delays to a threshold.

15. A device, comprising:
- one or more elements to:
  - transmit one or more packets on a plurality of paths, in response to a request to initiate a data transfer,
  - where the one or more packets include one or more first type of packets and one or more second type of packets, the device using the one or more first type of packets to determine timing information, and the device using the one or more second type of packets to perform at least one operation associated with transfer of data, and
  - where at least one first type of packet, of the one or more first type of packets, and at least one second type of packet, of the one or more second type of packets, are sent on one or more of the plurality of paths;
  - receive one or more responses to the transmitted one or more packets;
  - analyze at least one response time associated with at least one of the received one or more responses
  - determine to initiate the data transfer on a first path, of the plurality of paths, when the at least one response time does not exceed a threshold;
  - transmit one or more additional packets on the plurality of paths, when the at least one response time exceeds the threshold, the transmitted one or more additional packets including at least one of the one or more first type of packets and at least one of the one or more second type of packets; and
  - initiate the data transfer on a second path, of the plurality of paths, when one or more one response times, associated with one or more responses to the one or more additional packets, do not exceed the threshold.

16. The device of claim 15, where the one or more elements are further to:
- select at least one path when the at least one response time does not exceed the threshold, the at least one path including the first path, of the plurality of path.

17. The device of claim 16, where the plurality of paths comprise one or more label-switched paths, and
- where, when selecting the at least one path, of the plurality of paths, the one or more elements are further to:
- select at least one label-switched path, of the one or more label-switched paths.

18. The device of claim 15, where, when analyzing the at least one response time, the one or more elements are further to:
- analyze a response, of the one or more responses, to determine a state of resources, of a network, that are associated with the data transfer.

19. The device of claim 15, where the one or more elements are further to:
- determine that a variance in delays, associated with the one or more responses, exceeds a threshold;
- transmit, based on determining that the variance exceeds the threshold, the one or more additional packets; and
- initiate the data transfer on the second path when the one or more one response times do not exceed the threshold.

20. The device of claim 15, where the one or more elements are further to:
- operate a timer that tracks an amount of time elapsed between transmitting a packet, of the transmitted one or more packets, and receiving a response, of the received one or more responses, to the packet,
- where the one or more elements are to determine whether to initiate the data transfer, based on the tracked amount of time.

* * * * *

UNITED STATES PATENT AND TRADEMARK OFFICE
CERTIFICATE OF CORRECTION

| | | |
|---|---|---|
| PATENT NO. | : 8,094,580 B2 | Page 1 of 1 |
| APPLICATION NO. | : 12/694319 | |
| DATED | : January 10, 2012 | |
| INVENTOR(S) | : Pradeep Sindhu | |

It is certified that error appears in the above-identified patent and that said Letters Patent is hereby corrected as shown below:

Claim 15 (Column 13, line 48) after "responses", insert a --;--.

Claim 16 (Column 14, line 17) after "path" first occurrence delete ", of the plurality of path".

Signed and Sealed this
Third Day of April, 2012

David J. Kappos
*Director of the United States Patent and Trademark Office*